United States Patent
Slavin et al.

(10) Patent No.: US 10,623,622 B1
(45) Date of Patent: *Apr. 14, 2020

(54) MONITORING SYSTEM CONFIGURATION TECHNOLOGY

(71) Applicant: Alarm.com Incorporated, Tysons, VA (US)

(72) Inventors: Alison Jane Slavin, Falls Church, VA (US); Stephen Scott Trundle, Falls Church, VA (US); Colin Murray, Arlington, VA (US)

(73) Assignee: Alarm.com Inorporated, Tyson, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,808

(22) Filed: Aug. 31, 2018

Related U.S. Application Data

(63) Continuation of application No. 14/677,339, filed on Apr. 2, 2015, now Pat. No. 10,070,035.

(60) Provisional application No. 61/974,232, filed on Apr. 2, 2014.

(51) Int. Cl.
*H04N 5/232* (2006.01)
*H04N 7/18* (2006.01)

(52) U.S. Cl.
CPC ......... *H04N 5/23206* (2013.01); *H04N 7/181* (2013.01)

(58) Field of Classification Search
CPC .......................... H04N 5/23206; H04N 7/181
See application file for complete search history.

(56) References Cited

U.S. PATENT DOCUMENTS

| | | | | |
|---|---|---|---|---|
| 6,965,313 B1* | 11/2005 | Saylor | .................. | G08B 25/016 340/5.33 |
| 6,970,183 B1* | 11/2005 | Monroe | ................. | G08B 7/062 348/143 |
| 8,350,697 B2* | 1/2013 | Trundle | ................. | G08C 19/16 340/539.3 |
| 8,520,072 B1* | 8/2013 | Slavin | .............. | G08B 13/19684 348/143 |
| 8,525,665 B1 | 9/2013 | Trundle | | |
| 8,675,066 B2* | 3/2014 | Trundle | ............... | G08B 13/196 348/143 |
| 8,675,071 B1* | 3/2014 | Slavin | .................... | H04M 11/04 348/143 |
| 9,013,294 B1* | 4/2015 | Trundle | ............... | G08B 25/001 340/501 |

(Continued)

*Primary Examiner* — Irfan Habib
(74) *Attorney, Agent, or Firm* — Fish & Richardson P.C.

(57) ABSTRACT

An electronic system is described that receives data identifying a component of a monitoring system from a wearable electronic device that is associated with the monitoring system. The monitoring system is associated with a property and includes components that are fixed within the property and that are configured to sense attributes of the property. The wearable electronic device includes a heads-up display and communicates with the monitoring system over a wireless network. Based on the data identifying the component of the monitoring system, monitoring system data collected by the component of the monitoring system is accessed. At least a portion of the monitoring system data collected by the component of the monitoring system is provided to the wearable electronic device for display at the heads-up display of the wearable electronic device.

20 Claims, 6 Drawing Sheets

(56) References Cited

U.S. PATENT DOCUMENTS

| | | | |
|---|---|---|---|
| 9,064,394 B1 * | 6/2015 | Trundle | G08B 13/19684 |
| 9,319,668 B2 | 4/2016 | Kannermark | |
| 9,386,281 B2 * | 7/2016 | Trundle | G08B 13/19602 |
| 9,465,278 B2 * | 10/2016 | Lytle | G03B 17/561 |
| 9,661,207 B2 * | 5/2017 | Lytle | H04N 5/23206 |
| 9,665,778 B1 * | 5/2017 | Trundle | G08B 13/19684 |
| 9,692,868 B2 * | 6/2017 | Lee | H04M 1/7253 |
| 9,854,050 B1 | 12/2017 | Trundle | |
| 10,070,035 B2 | 9/2018 | Slavin et al. | |
| 2006/0103590 A1 | 5/2006 | Divon | |
| 2007/0009104 A1 * | 1/2007 | Renkis | G08B 13/19615 380/270 |
| 2014/0031057 A1 | 1/2014 | Brassil et al. | |

\* cited by examiner

MONITORING SYSTEM CONFIGURATION TECHNOLOGY

CROSS-REFERENCE TO RELATED APPLICATION

This application is a continuation (and claims the benefit of priority under 35 USC 120) of U.S. application Ser. No. 14/677,339, filed Apr. 2, 2015, which claims the benefit of U.S. Provisional Application Ser. No. 61/974,232, filed Apr. 2, 2014. Both of these prior applications are incorporated by reference in their entirety.

TECHNICAL FIELD

This application relates to data communication between devices.

BACKGROUND

A monitoring system for a property can include various components including sensors, cameras, and other devices that enable monitoring of the property. A user can modify the monitoring system by adding, removing, or reconfiguring components of the monitoring system.

SUMMARY

Techniques are described for assisting a user who is modifying a monitoring system to add or configure a component of the monitoring system.

Implementations of the described techniques may include hardware, a method or process implemented at least partially in hardware, or a computer-readable storage medium encoded with executable instructions that, when executed by a processor, perform operations.

The details of one or more implementations are set forth in the accompanying description below. Other features will be apparent from the description of the drawings.

DETAILED DESCRIPTION

Figure 1:
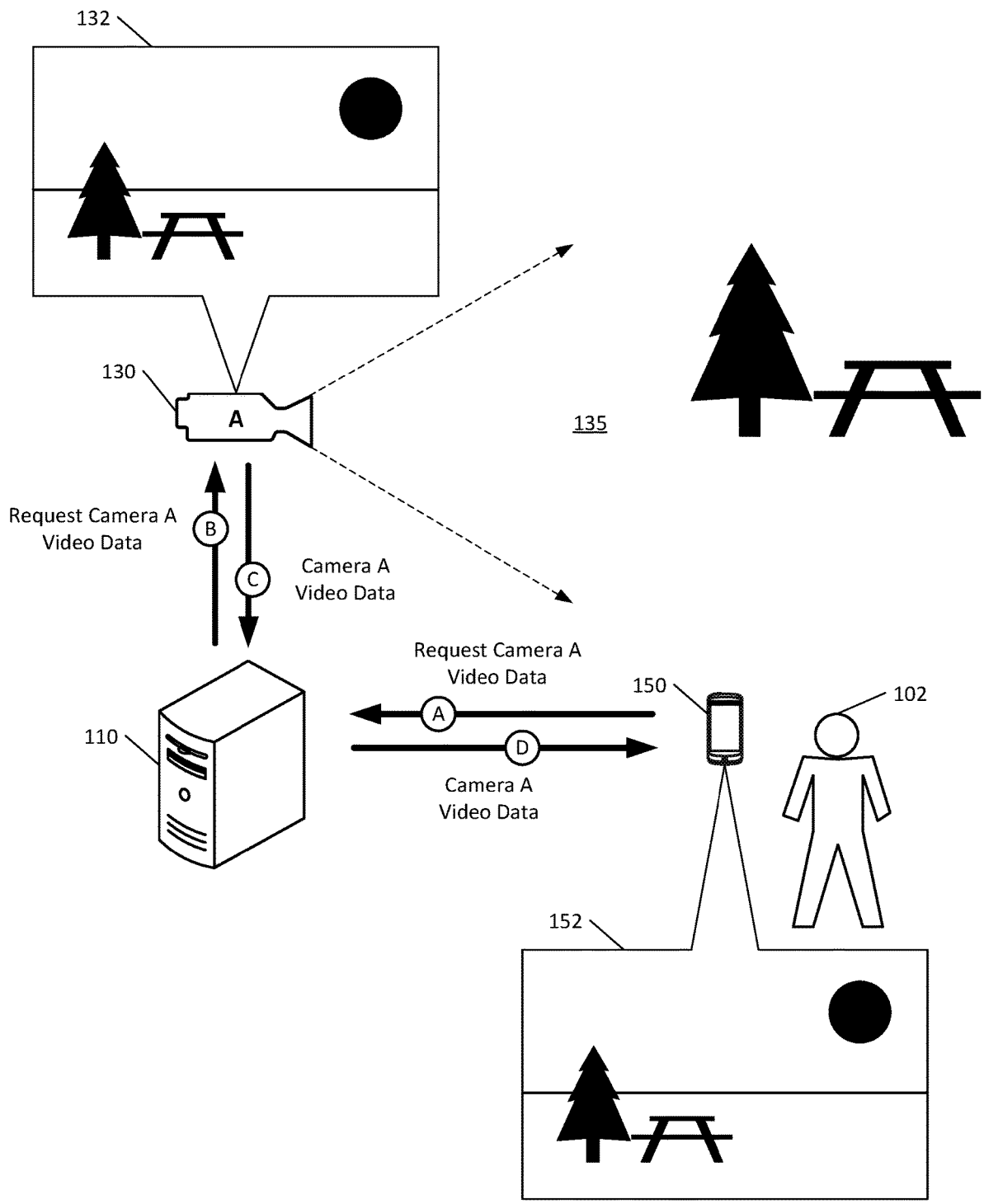
FIG. 1 illustrates an example of a system that assists with configuring a component of a monitoring system.

Techniques are described for performing monitoring system configuration using a wearable electronic device, such as a device that includes a heads-up display (HUD). In some implementations, a HUD device is able to transmit and receive data from a monitoring system that is associated with a home, business, vacation, or other property. In some implementations, the monitoring system can be associated with one or more cameras, sensors, or other components, such as locks, appliances, heating, ventilation, and air conditioning (HVAC) systems, or other devices associated with the property. A wearable electronic device equipped with a HUD includes a software application that enables the device to communicate with the monitoring system. The device can transmit data to, and receive data from, components of the monitoring system, such as video footage obtained by one or more video cameras associated with the monitoring system or sensor data obtained by one or more sensors associated with the monitoring system. Communication between the device and the components of the monitoring system can aid processes associated with configuring the monitoring system. In addition, a user of a wearable electronic device equipped with a HUD can control the monitoring system or components of the monitoring system using the device.

In some implementations, an installer or other user can use a wearable electronic device that features a HUD when configuring or installing components of a monitoring system to ensure that the monitoring system components are properly installed and functional to perform their designated tasks. For example, while installing a monitoring system camera, an installer can associate a wearable electronic device featuring a HUD with the monitoring system, and can configure the device to display the camera's field of view in the device's HUD. Since the installer is able to view the camera's field of view while actively installing the camera, the installer can configure the camera to have the desired field of view with limited additional effort. For example, if the camera to be installed is located in a hard-to-reach area of a property, such as a roof of the property, the installer may be able to adjust the camera's field of view from the location of the camera while installing the camera. That is, the installer may be able to actively adjust the positioning of the camera and view changes to the camera's field of view in near real time, without having to iteratively check the camera's field of view at another location and return to the camera to adjust its view.

In other examples, an installer of a monitoring system can install a sensor associated with the monitoring system, and can utilize a wearable device featuring a HUD to test the functionality of the sensor during the installation process and without the inefficiency of testing the sensor's functionality from, for example, a control panel of the monitoring system. The installer can receive data at the HUD that indicates whether the test was successful, or may be presented with information that enables the installer to perfect the installation of the sensor.

FIG. 1 illustrates an example of a system 100 that assists with the installation and configuration of a component of a monitoring system. For example, a monitoring system that is associated with a property may include a monitoring system control unit 110 that is in communication with one or more sensors, cameras, or other components of the monitoring system. The monitoring system control unit 110 can include one or more control panels, servers, or other computer systems that are configured to receive, process, and/or transmit data related to the operation of the monitoring system.

In FIG. 1, an installer 102 equipped with a wearable electronic device 150 that includes a HUD 152 is adding a camera 130 to the monitoring system associated with the property. The installer 102 may, for example, be installing the camera 130 at a location of the property, where the camera 130 is to be configured to monitor a certain area of the property, such as a picnic area of the property. In some instances, the installer 102 may be required to install the camera 130 at location that is difficult to access, or a location that is distant from any control panel or other control device associated with the monitoring system. For example, in order for the camera 130 to monitor the picnic area of the property, the installer 102 may need to attach the camera 130 to a roof of the property being monitored by the monitoring system.

After the installer 102 has physically mounted the camera 130 and has activated the camera 130 such that the monitoring system can communicate with the camera 130, the installer 102 must test the camera 130 to ensure that the camera 130 is functioning, that the field of view 135 of the camera 130 is directed in the proper direction so as to include the picnic area of the property, and/or that images or video captured by the camera 130 are of the necessary clarity to enable effective monitoring of the picnic area of the property. While the installer 102 may be able to perform such a function by testing the camera 130 or viewing the images or video obtained by the camera 130 at a control panel or other computing device associated with the monitoring system control unit 110, it is advantageous for the installer 102 to test the camera 130 from the location at location of the camera 130. By doing so, the installer 102 may be able to directly adjust the field of view 135 of the camera 130, may be able to troubleshoot the camera's 130 wiring or configuration if the camera 130 is not functioning properly, or may be able to adjust the image or video capture parameters used by the camera 130 if the images or video obtained by the camera are not sufficiently clear.

To test the camera 130 from the location of the camera 130, the installer 102 interacts with their wearable electronic device 150 to cause images, video, or other information obtained by or relevant to the camera 130 to be displayed at the HUD 152 of the wearable electronic device 150. Once the installer 102 has installed the camera 130, the installer 102 can activate the camera 130, for example, by powering on the camera 130 and activating the camera 130 to enable the camera 130 to communicate with the monitoring system control unit 110. The installer 102 can also activate their wearable electronic device 150 to be in communication with the monitoring system control unit 110, for example, by turning on the wearable electronic device 150, activating an application on the wearable electronic device 150 that is associated with interacting with the monitoring system, connecting the wearable electronic device 150 to the monitoring system control unit 110 over one or more networks, or otherwise configuring the wearable electronic device 150 to communicate with the monitoring system control unit 110.

Based on both the wearable electronic device 150 and the camera 130 being in communication with the monitoring system control unit 110, the installer 102 provides input at the wearable electronic device 150 that identifies the camera 130 and requests information related to the camera 130 (Step A). For example, the installer 102 can provide input to the wearable electronic device 150 that identifies the camera 130 from among one or more other components of the monitoring system, such as one or more other cameras, sensors, controllers, or other monitoring system components. The installer 102 may also request specific data from or relating to the camera 130. For instance, in FIG. 1 the installer 102 requests video data obtained by the camera 130, so that the installer 102 may adjust the field of view 135 of the camera 130 to focus on the picnic area of the property that the monitoring system is configured to monitor. Additionally or alternatively, the installer 102 may request other data from or relating to the camera 130, for example, data indicating the strength of a network connection used by the camera 130 to communicate with the monitoring system control unit 110, data indicating a rate of data communication between the camera 130 and the monitoring system control unit 110, data indicating a state of the camera 130, data indicating the battery state of the camera 130, or other data relevant to the camera 130.

The monitoring system control unit 110 receives the information from the wearable electronic device 150 that identifies the camera 130. Based on this received information, the monitoring system control unit 110 transmits a request for video data to the camera 130 (Step B). The monitoring system control unit 110 can receive the request, and in response can transmit video data obtained by the camera 130 to the monitoring system control unit 110 (Step C).

In some implementations, the information requested by the installer 102 may be information that does not require the monitoring system control unit 110 to transmit a request to the camera 130, or that may not require the monitoring system control unit 110 to receive information from the camera 130. For example, in some implementations the camera 130 may transmit video data to the monitoring system control unit 110 without the monitoring system control unit 110 requesting the video data, such that the monitoring system control unit 110 is not required to transmit a request to the camera 130 to obtain the video data. In another example, the monitoring system control unit 110 may be capable of determining the information requested by the installer 102 without having to request information from the camera 130. For instance, the monitoring system control unit 110 may be capable of testing the strength of a wireless network connection between the camera 130 and the monitoring system control unit 110 without a need to request and/or receive information from the camera 130. Similarly, the monitoring system control unit 110 may be capable of determining whether the camera 130 has power without communicating with the camera 130 directly.

In some implementations, the monitoring system control unit 110 may request and/or receive information from the camera 130 that is different from the information requested by the installer 102. The monitoring system control unit 110 may then perform an analysis of the information received from the camera 130, to determine a response to the request provided by the installer 102. For instance, if the installer 102 requests information indicating the strength of a network connection between the monitoring system control unit 110 and the camera 130, the monitoring system control unit 110 may communicate test data with the camera 130, for example, by transmitting a small packet of data to the camera 130 and receiving a response to the transmission that is another packet of data. The monitoring system control unit 110 may then perform an analysis, for instance, to determine how much time was required to send and receive the data packets, thereby determining the strength of the network.

The monitoring system control unit 110 provides a reply to the wearable electronic device 150 that includes a response to the request of the installer 102 (Step D). For example, as shown in FIG. 1, in response to the installer 102 requesting the video data obtained by the camera 130, the monitoring system control unit 110 transmits the video data obtained from the camera 130 to the wearable electronic device 150. The wearable electronic device 150 then provides the received video data for display at the HUD 152 of the wearable electronic device 150. By receiving the video of the camera 130 in the HUD 152 of the wearable electronic device 150 that the installer 102 is wearing, the installer 102 is provided with a hands-free solution in which they are able to adjust the field of view 135 of the camera 130 while being able to view the effects of those adjustments in near real-time.

In other examples, the information provided by the monitoring system control unit 110 to the wearable electronic device 150 can be other information configured for display at the HUD 152 of the wearable electronic device 150. For example, if the installer 102 requests to do a test of the camera 130, the monitoring system control unit 110 can transmit information to the wearable electronic device 150 that indicates whether the camera 130 successfully completed the test. The wearable electronic device 150 can provide information for display at the HUD 152 that indicates whether the test was successful, and may additionally provide other information relating to the request of the installer 102. For example, the monitoring system control unit 110 may provide information for display at the HUD 152 of the wearable electronic device 150 that indicates that a test of the camera 130 was unsuccessful, and additionally providing possible reasons why the camera 130 failed the test or steps to troubleshoot the camera 130.

Figure 2:
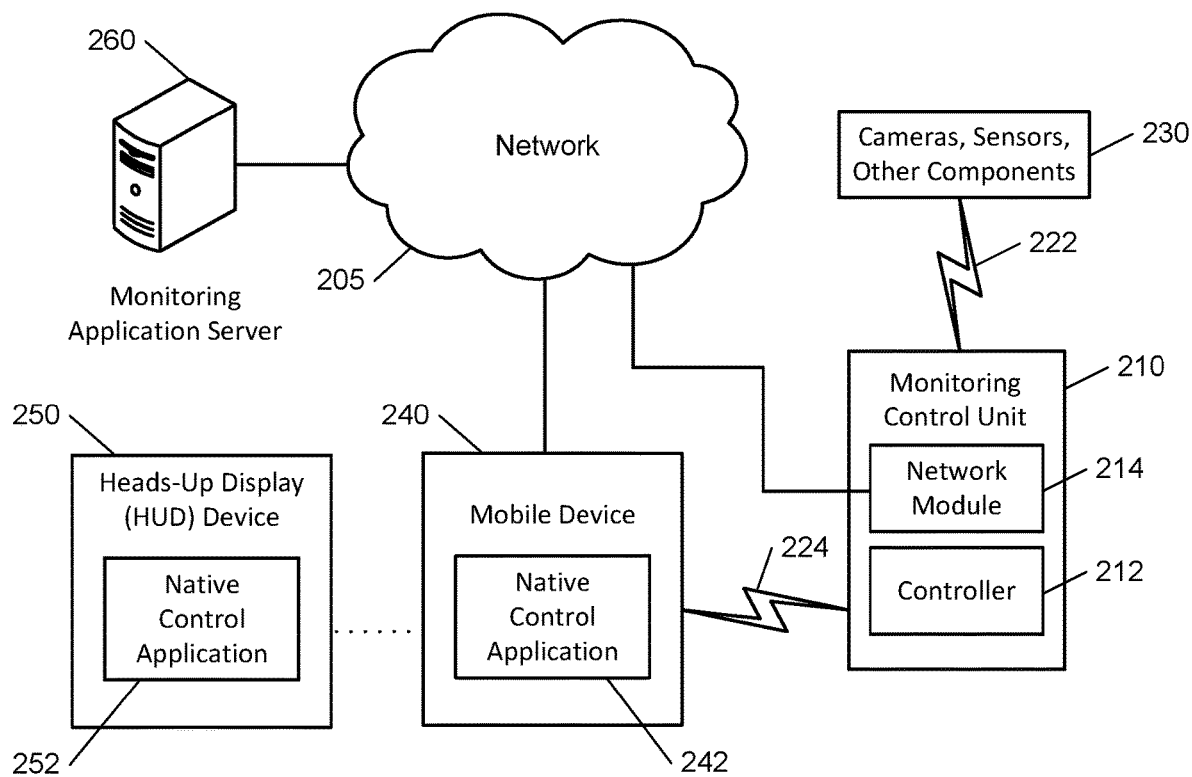
FIG. 2 depicts an example system that is capable of assisting with the configuring of a component of a monitoring system.

FIG. 2 illustrates an example of a monitoring system 200 configured to communicate with a wearable device that features a heads-up display. The monitoring system 200 includes a network 205, a monitoring control unit 210, one or devices 240, 250 including the HUD device 250, a monitoring application server 260, and one or more components that are interfaced with the monitoring control unit 210 via the module 230.

The network 205 is configured to enable electronic communications between devices connected to the network 205. For example, the network 205 can be configured to enable the exchange of electronic communications between the monitoring control unit 210, the one or more devices 240, 250, and the monitoring application server 260.

The network 205 can include, for example, one or more of the Internet, Wide Area Networks (WANs), Local Area Networks (LANs), e.g., Wi-Fi, ZigBee, or Z-Wave networks, analog or digital wired and wireless telephone networks, e.g., a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. Network 205 can include multiple networks or subnetworks, each of which can include, for example, a wired or wireless data pathway. The network 205 can include a circuit-switched network, a packet-switched data network, or any other network able to carry electronic communications (e.g., data or voice communications). For example, the network 205 can include networks based on the Internet protocol (IP), asynchronous transfer mode (ATM), the PSTN, packet-switched networks based on IP, X.25, or Frame Relay, or other comparable technologies and can support voice using, for example, VoIP, or other comparable protocols used for voice communications. The network 205 can include one or more networks that include wireless data channels and wireless voice channels. The network 205 can be a wireless network, a broadband network, or a combination of networks including a wireless network and a broadband network.

The monitoring control unit 210 includes a controller 212 and a network module 214. The controller 212 is configured to control a device system that includes the control unit 210, e.g., one or more cameras, sensors, or other components associated with a property's monitoring system. In some examples, the controller 212 can include a processor or other control circuitry configured to execute instructions of a program that controls operations of one or more cameras, sensors, or other components of the monitoring system. In these examples, the controller 212 can be configured to receive input from one or more devices 240, 250 associated with the property, and can control the configuration or operation of one or more components associated with the monitoring system based on the input received from the devices 240, 250. For example, the controller 212 may receive input configuring a particular camera associated with the monitoring system 200 from a HUD device 250, and can configure the field of view of the particular camera based on the input received from the HUD device 250.

The network module 214 is a communication device configured to exchange communications over the network 205. The network module 214 can be a wireless communication module configured to exchange wireless communications over the network 205. For example, the network module 214 can be a wireless communication device configured to exchange communications over a wireless data channel. In this example, the network module 214 can transmit sensor data captured by one or more cameras or sensors of the monitoring system 200, data associated with controlling one or more other components of the monitoring system 200, data associated with configuring one or more cameras, sensors, or other components associated with the monitoring system 200, data associated with users of the property, or other information over a wireless data channel. The wireless communication device can include one or more GSM modules, a radio modem, a cellular transmission module, or any type of module configured to exchange communications in one of the following formats: GSM or GPRS, CDMA, EDGE or EGPRS, EV-DO or EVDO, UMTS, or IP.

The network module 214 can also be a wired communication module configured to exchange communications over the network 205 using a wired connection. For instance, the network module 214 can be a modem, a network interface card, or another type of network interface device. The network module 214 can be an Ethernet network card configured to enable the monitoring control unit 210 to communicate over a local area network and/or the Internet. The network module 214 can also be a voiceband modem configured to enable the monitoring control unit 210 to communicate over the telephone lines of Plain Old Telephone Systems (POTS). In some implementations, the monitoring control unit 210 can be a broadband or cellular gateway where the network module 214 can enable the monitoring control unit 210 to communicate over the network 205.

The module 230 is connected to one or more cameras, sensors, or other components of the monitoring system 200 that are configured to monitor and/or control various aspects of a property. For example, cameras and/or sensors associated with the monitoring system 200 may be configured to monitor activity and/or conditions in various zones of a property (e.g., at various indoor or outdoor locations of the property). For example, cameras connected to the module 230 can include various video, still-image, infrared, night-vision, or other cameras that are configured to monitor activity at a property. Sensors connected to the module 230 may include various activity sensors, such as motion sensors, contact sensors, etc., or may additionally or alternatively include various environmental sensors, such as temperature sensors, humidity sensors, noise sensors, light sensors, air quality sensors, smoke detectors, carbon monoxide detectors, water sensors, rain sensors, wind sensors, etc. Other components associated with the monitoring system 200 can include door and window locks, furnaces, air conditioners, ovens and stovetops, fans, garage doors, etc. The module 230 connected to the one or more cameras, sensors, or other components can exchange electronic communications with the monitoring control unit 210. For example, a video camera can communicate video data to the monitoring control unit 210 via the module 230 and/or can receive data directed to configuring or controlling the video camera from the monitoring control unit 210 via the module 230.

The module 230 can communicate with the controller 212 over the communications link 222. The communication link 222 can be a wired or wireless data pathway configured to transmit signals from the module 230 to the monitoring control unit 210. The module 230 can continuously transmit and receive data from the controller 212, can periodically transmit and receive data from the controller 212, or can transmit and receive data from the controller 212 in response to detecting events, e.g., in response to detecting a change in a sensed value by a sensor of the monitoring system. The cameras, sensors, and other components of the monitoring system that are in communication with the monitoring control unit 210 via the module 230 can continuously or periodically transmit and receive information from the module 230, or can transmit and receive information from the module 230 in response to detecting a specific event (e.g., an event at the property or an error relating to one or more of the cameras, sensors, or other components).

In some implementations, cameras, sensors, or other components can communicate directly with the monitoring control unit 210. For example, the monitoring control unit 210 can communicate with a camera, sensor, or other component of a monitoring system to send and/or receive information related to controlling the camera, sensor, or component, information identifying the status of the camera, sensor, or component, or other information. In some instances, the monitoring control unit 210 can communicate information directly to both the module 230 and one or more cameras, sensors, and/or other components.

The monitoring application server 260 is an electronic device configured to provide monitoring services and enable monitoring system configuration by exchanging electronic communications with the monitoring control unit 210 and the one or more devices 240, 250 over the network 205. For example, the monitoring application server 260 can be configured to receive video data obtained by the monitoring control unit 210. In this example, the monitoring application server 260 can exchange electronic communications with the network module 214 included in the monitoring control unit 210 to receive video data obtained by one or more cameras of the monitoring system 200 that are in communication with the monitoring control unit 210. The monitoring application server 260 can transmit the obtained video data to one or more of the devices 240, 250, such as by transmitting the video data obtained by the one or more cameras to the HUD device 250. Additionally, the monitoring application server 260 can receive information from the one or more devices 240, 250. For example, the monitoring application server 260 can receive information from the one or more mobile devices 240, 250 that indicates the locations of the one or more devices 240, 250 or that includes commands requested by users of the one or more devices 240, 250. In some implementations, the monitoring application server 260 can receive information from one or more other sources. For example, the monitoring application server 260 can receive information over the network 205 relating to events that are potentially relevant to the property (e.g., weather data, crime data, etc.).

In some implementations, the monitoring application server 260 can be connected to the Internet over the network 205 and can access information at a website or database that is accessible on the Internet. Additionally or alternatively, the monitoring application server 260 can store information at a local database or other data storage component and can access the stored information. For example, the monitoring application server 260 can access installation instructions or troubleshooting instructions relating to cameras, sensors, or other components of the monitoring system 200 at a website or database that is accessible via the Internet. The monitoring application server 260 can access the installation or troubleshooting instructions and can transmit information associated with the instructions to one or more devices 240, 250, for example, by causing the installation or troubleshooting instructions to be presented in the HUD of the HUD device 250.

The monitoring application server 260 can store data (e.g., video or image data obtained by cameras of the monitoring system 200, sensor data from sensors of the monitoring system 200, or performance data from appliances or HVAC system components associated with the monitoring system 200) and can perform analysis of the stored data. Based on the analysis, the monitoring application server 260 can communicate with and control components of the monitoring system 200, such as one or more cameras, sensors, or other components that are connected to the monitoring control unit 210 via the module 230.

The one or more devices 240, 250 are devices that host one or more native applications (e.g., the native control applications 242, 252). The one or more devices 240, 250 can be cellular phones or non-cellular locally networked devices. The one or more devices 240, 250 can include a cell phone, a smart phone, a tablet PC, a personal digital assistant ("PDA"), a wearable computing device, or any other stationary or portable device configured to communicate over a network. For example, implementations can also include Blackberry-type devices (e.g., as provided by Research in Motion), electronic organizers, iPhone-type devices (e.g., as provided by Apple), iPod devices (e.g., as provided by Apple), or other portable music players, other communication devices, and handheld, wearable, or portable electronic devices for gaming, communications, and/or data organization. The one or more devices 240, 250 can be the same or can include mobile devices of different types. The one or more devices 240, 250 can perform functions unrelated to the monitoring system, such as placing personal telephone calls, playing music, playing video, displaying pictures, browsing the Internet, maintaining an electronic calendar, etc. The devices 240, 250 include at least one HUD device 250, where the HUD device is a wearable electronic device that is capable of displaying information in a HUD, of hosting the native control application 252, and of communicating with one or more components of the monitoring system 200. In some implementations, the HUD device 250 can feature one or more cameras, and/or one or more means of providing user input, e.g., via a touch screen, by using gestures, or using other inputs. For example, the HUD device 250 can be an optical head-mounted display (OMHD) device that displays information and enables user interaction in a hands-free format by using natural language voice commands, gestures, or other actions, and that can communicate with one or more components of the monitoring system 200 using wireless connections. In some examples, the HUD device 250 may be a device similar to Google Glass, or another OMHD device.

In some implementations, the HUD device 250 that features the native control application 252 may enable users to interact with the device in specific ways to control the monitoring system or to navigate within the native control application 252. For example, the native control application 252 may enable users to provide inputs by using head nod gestures. As an example, a head nod in a particular direction may cause the native control application 252 to navigate through menus, to zoom in or out on particular information in the HUD, to toggle the display of information relating to various components of the monitoring system, to activate or deactivate the monitoring system 200, etc.

In some implementations, the one or more devices 240, 250 can communicate with the monitoring control unit 210 via the communication link 224. For instance, the one or more devices 240, 250 can communicate with the monitoring control unit 210 using various local wireless protocols, such as Wi-Fi, Bluetooth, Z-Wave, ZigBee, HomePlug (Ethernet over powerline), or wired protocols such as Ethernet, USB, and other wired protocols based on the RS232, RS485, and/or RS422 standards. The one or more devices 240, 250 can connect locally to the monitoring control unit 210 and/or other components of the monitoring system 200 (e.g., one or more cameras, sensors, or other components). The local connection can improve the speed of communications because communicating through the network 205 with a remote server (e.g., the monitoring application server 260), can be slower.

Although the one or more devices 240, 250 are shown communicating with the monitoring control unit 210, in some implementations, the one or more devices 240, 250 can communicate directly with the cameras, sensors, and other components that are in communication with the monitoring control unit 210. In some implementations, the one or more devices 240, 250 replace the monitoring control unit 210 and perform the functions of the monitoring control unit 210 for local control and long range or offsite communication and/or control.

In other implementations, the one or more devices 240, 250 receive data from the monitoring control unit 210 through the network 205. The one or more devices 240, 250 can receive the data from the monitoring control unit 210 through the network 205 or from the monitoring application server 260 and can transmit or relay data to the monitoring control unit 210 or the monitoring application server 260 through the network 205. In this regard, the monitoring application server 260 can facilitate communications between the one or more devices 240, 250 and the monitoring control unit 210.

Although the one or more devices 240, 250 are shown in FIG. 2 as being connected to the network 205, in some implementations, the one or more devices 240, 250 are not connected to the network 205. In these implementations, the one or more devices 240, 250 may communicate directly with one or more of the monitoring system components without requiring a network connection.

In some implementations, the one or more devices 240, 250 are used in conjunction with only local cameras, sensors, and other components of a property's monitoring system. In these implementations, the monitoring system 200 only includes the one or more devices 240, 250 and the module 230. The one or more devices 240, 250 can receive data directly from the modules 230 and/or the components connected to the module 230, and can send data directly to the module 230 and/or the components connected to the module 230. The one or more mobile devices 240, 250 provide the appropriate interfaces and/or processing to provide for control of the monitoring system, including capabilities to modify monitoring system preferences, control monitoring system components, respond to events detected by the monitoring system, etc.

The one or more devices 240, 250 each include a native control application 242, 252, respectively. The native control application 242, 252 refers to a software/firmware program running on the corresponding device that enables the described features. The one or more devices 240, 250, including the HUD device 250, can load or install the native control application 242, 252 based on data received over a network or data received from local media. The native monitoring application 242, 252 can run on mobile devices' platforms, such as Apple iOS, iPhone, iPod touch, Blackberry, Google Android, Windows Mobile, Mobile Linux, Firefox OS, etc.

The described technology for configuring a monitoring system enables a user having a device with a heads-up display to view information associated with the monitoring system directly in the heads-up display, and to control or otherwise interact with the monitoring system using the device. By enabling the user to view information associated with the monitoring system and to interact with the monitoring system via the HUD device, a user can install monitoring system cameras, sensors, and other components with greater efficiency than in scenarios when the user must physically install the cameras, sensors, or components in one location, and must test and configure the cameras, sensors, and other components at a different location.

In some implementations, as described, an electronic device featuring a HUD is capable of running an application that enables users to interact with a property's monitoring system via the HUD device. For example, the HUD device 250 may feature a heads-up display and one or more methods of interacting with the HUD device 250, such as a touchscreen, buttons, joystick, voice interface, capabilities to detect a user's movements or gestures, capabilities to track a user's eye movements, or other interaction mechanism. The HUD device 250 can run a native control application 252 that enables the HUD device 250 to communicate with the monitoring application server 260, monitoring control unit 210, and/or other components of the monitoring system 200. In some applications, a user associated with the HUD device 250 can launch the native control application 252 while using the HUD device 250, for example, by providing an input at a touchscreen of the HUD device 250 or by providing a voice command that causes the native control application 252 to launch.

When the HUD device 250 is running the native control application 252, the HUD device 250 can receive information relating to the monitoring system 200 and can display the received information in the device's HUD. For instance, the HUD device 250 can receive images or video obtained by one or more cameras associated with the monitoring system 200, data obtained by one or more sensors of the monitoring system 200, activity logs of one or more other components of the monitoring system 200, testing results relating to one or more particular cameras, sensors, or other components of the monitoring system 200, installation or troubleshooting instructions relating to one or more particular cameras, sensors, or other components of the monitoring system 200, or other information relating to the monitoring system 200. The received information can be presented in the HUD of the HUD device 250.

Additionally, a user associated with the HUD device 250 can provide inputs at the HUD device 250 to perform actions relating to the monitoring system 200. For example, the user may provide input at the HUD device 250 by swiping a touchscreen of the HUD device 250, performing a certain gesture or head movement that is detectable by the HUD device 250, by speaking voice commands that are discernible by the HUD device 250, or by otherwise providing input at the HUD device 250. Based on receiving the user input, the HUD device 250 can transmit information related to the user inputs to the monitoring application server 260, monitoring control unit 210, or other components of the monitoring system 200 to perform the requested actions.

A HUD device that is in communication with a monitoring system can display images or video captured by a particular camera or video camera associated with the monitoring system in the device's HUD. For example, an installer of the monitoring system 200 can be equipped with HUD device 250, and can be in the process of installing a video camera in the monitoring system 200. The video camera can communicate with the monitoring system 200 via the module 230. After connecting the video camera to the monitoring system 200, the installer may configure the video camera, for example, by adjusting the video camera's field of view, color balance, contrast, brightness, or other image properties associated with the video camera, or the installer may otherwise test whether the video camera is functioning properly in the monitoring system 200. In some implementations, after the installer has connected the video camera to the monitoring system 200, the installer can provide input that causes a video feed from the installed camera to be projected at the HUD of the HUD device 250. Since the HUD device 250 can receive and display the video camera's field of view to the installer while the installer is at the site of the video camera, the installer may be able to configure the video camera from the location of the video camera while being able to view the results of configuring the camera in near real time. For example, as the user adjusts the video camera's field of view by tilting or mounting the video camera in a new location, the installer may be able to view the video camera's new field of view to decide if the new tilt or positioning of the video camera provides an acceptable field of view for the monitoring system 200 to function properly. Similarly, an installer may be able to adjust the color settings of a particular video camera by displaying a color chart to the video camera, and performing processing on the colors detected by the video camera to tune the video camera's color settings.

Additionally, in some implementations an installer of the monitoring system 200 may request and view information associated installing or configuring a component of the monitoring system. For example, an installer that is installing a camera in the monitoring system 200 may provide input to the HUD device 250 that identifies the particular camera, a model of the particular camera, or other information that identifies the camera that the installer is installing. In response, installation or configuration instructions for the camera, instructional videos or images related to the installation or configuration of the camera, or other installation information can be accessed. For instance, the monitoring application server 260 may receive information identifying the model of the camera, and may access installation instructions or an instructional video related to installing the particular model of camera. At least a portion of the accessed installation information can be provided for output at the HUD device 250 to provide the installer with information on how to install the camera while they are actively doing so.

In another example, the installer may request information related to configuring the camera, such as configuring the camera's contrast, white balance, or other image or video capture parameters. The monitoring application server 260 or another element of the monitoring system 200 may identify information that indicates how to configure the camera, information indicating how changes to certain parameters affect the operation or images captured by the camera, or other information related to configuring the camera. The accessed information can be presented to the installer at the HUD device 250 to allow the installer to view this information while they are configuring the camera.

In some implementations, a user or installer may be able to control the pan and tilt of a video camera from the HUD device 250, such that the video camera's field of view can be adjusted to coincide or nearly coincide with the user's field of view from the HUD device 250. In such an implementation, a camera of the HUD device 250 can capture image data, and the pan and tilt of the video camera can be adjusted to match the field of view of the camera of the HUD device 250. In other implementations, a user or installer may provide input at the HUD device 250 to control the pan and tilt of the video camera. For instance, a user may perform a particular gesture, such as by nodding their head in a particular direction, to adjust the pan and tilt of the HUD device 250 based on the input (e.g., such that a user nodding their head to the left causes the video camera to pan to the left).

Furthermore, in some implementations, a user equipped with a HUD device may be able to provide commands at the HUD device that control the display of data at the HUD device. For example, an installer having the HUD device 250 and who is installing a video camera in the monitoring system 200 may be able to provide input at the HUD device 250 to alternate between viewing various types of data for the video camera that is being installed. For instance, the installer may first request to view the video feed obtained by the video camera that they are installing, and may subsequently request to view the battery life of the video camera they are installing. The installer may provide input at the HUD device 250 that causes the information presented to the installer to change from the video feed of the video camera to data indicating the remaining battery life of the video camera.

Additionally, the installer may be able to provide input at the HUD device 250 to alternate between viewing data associated with the video camera being installed and data associated with other components of the monitoring system 200. For example, the installer equipped with the HUD device 250 may desire to optimize the fields of view of two or more video cameras to provide an optimal view of a particular zone of the property associated with the monitoring system 200. To aid in optimizing the collective field of view of the video cameras, the installer may provide input at the HUD device 250 that causes the HUD device 250 to display the video feeds of one or more of the video cameras that are monitoring the particular zone of the property. In some instances, the user may provide input at the HUD device 250 that causes the video feeds of two or more cameras to be displayed simultaneously in the HUD of the HUD device 250, may provide input to cycle through the video feeds of two or more of the video cameras, may provide input that selects a particular camera's field of view for display in the HUD, or may configure the video feeds of the cameras to be presented in the HUD in other ways.

The video data displayed to an installer or user can be configured to stream continuously to the HUD device, or can be presented to the user or installer as a sequence of frames that are updated periodically. For example, the HUD device 250 associated with the installer may receive one image every second from the video feed of a video camera of the monitoring system 200, and may present the stream of images to the user in the HUD of the HUD device 250. In some instances, the frequency that images are obtained from the video feed and transmitted to the HUD device 250, or the quality of the images that are obtained from the video feed and transmitted to the HUD device 250, can be dependent upon user preferences, network connectivity of the HUD device 250, upon the remaining battery life of the HUD device 250 and/or the video camera providing the video feed, or based upon other factors. For example, a user may set a preference (e.g., at the native control application 252) that dictates how frequently images from the video feed of the video camera are transmitted to the HUD device 250 (e.g., ranging from a continuous stream at 30 frames per second to intermittent images that are updated once every 5 seconds). Similarly, the user may set a preference related to the image quality of the images displayed at the HUD device 250 (e.g., ranging from high-resolution at 1920×1080 pixels to low resolution at 848×480 pixels). In other implementations, user preferences may be combined with or superseded by frame rate and image quality settings that are dependent upon network connectivity and/or video camera or HUD device battery life. For example, the HUD device 250 may display lower resolution images less frequently while a network connection of the HUD device 250 to the network 205 is weak and/or battery life of the HUD device 250 is low, and will display higher resolution images at a greater frame rate when the network connection is strong and/or battery life is adequate. In some instances, the images presented at the HUD of the HUD device 250 may be all of the images obtained by a particular camera or may be a subset of the images obtained by the camera. For example, if the camera is obtaining video, all of the frames of video may transmitted to the HUD device 250, the HUD device may present frames periodically obtained from the video, e.g., every fiftieth frame of the video. In other examples, a camera that obtains images once every second may have all of these images presented at the HUD device 250, or may have a subset of these images presented at the HUD device 250.

In some implementations of the described subject matter, a user equipped with a HUD device that is in communication with a monitoring system can configure the HUD device to display data relating to tests performed on components of the monitoring system. For instance, an installer who is installing a sensor in the monitoring system 200 may be equipped with a HUD device 250, and after installing the sensor the installer may perform a test to confirm that the sensor is functioning properly in the monitoring system 200. The installer can connect the sensor to the monitoring system 200 as a part of the installation process and can provide input at the HUD device 250 to initialize testing of the sensor. Results of the test can be returned to the HUD device 250 and presented to the installer within the HUD. By presenting test results to the installer within the HUD, the installer may be able to view the results of the test while maintaining the ability to use their hands; an important feature when the installer is in a precarious position such as standing on a ladder, or when the information presented to the installer may enable the installer to reconfigure or otherwise adjust the sensor while viewing the information.

In some instances, information presented to an installer as a part of testing a camera, sensor or other component of the monitoring system 200 can include messages indicating whether testing of the camera, sensor, or component was successful. For example, after installing and testing a motion sensor at a property, the installer test the motion sensor to determine whether the sensor is connected to the monitoring system 200 and whether the motion sensor is functioning properly within the monitoring system 200. A message may be displayed to the installer in the HUD of the HUD device 250 that indicates if the motion sensor successfully passed the test (e.g., by displaying a green check mark and the message "Successful") or failed the test (e.g., by displaying a red cross and the message "Failed").

In some instances, test results presented to the installer within the HUD can include additional details, for example, information indicating whether data communications with the sensor were successful, whether the type of notification provided by a sensor was accurate (e.g., if a motion sensor properly reported motion detection), whether the sensor is recognized as being associated with a proper sensor group or zone of the property (e.g., if a sensor in a kitchen of the property is properly registered as being located in the kitchen and not in the garage of the property), whether alarms triggered by the sensor are appropriate (e.g., if triggering of a door sensor causes an intruder alarm to be triggered, and not another alarm type), etc. In some implementations, indications can be presented for one or more criteria analyzed in the testing process to convey whether the component of the monitoring system 200 being tested passed or failed the test with respect to each of the criteria. For example, a sensor that is identified as passing a test (e.g., a motion sensor properly reporting detected motion) may display a green check mark and the message "Successful" in associated with certain criteria, but may present a red cross and the message "Failed" in association with other criteria. For example, a motion sensor may properly detect motion near the sensor, but may trigger an improper alarm based on detecting the motion. Therefore, criteria associated with motion detection may be identified as "Successful" tests, while criteria associated with providing alarms may be identified as "Failed" tests.

Based on determining that a particular camera, sensor, or component of a monitoring system has failed a test, information can be presented to an installer via a HUD device that identifies potential reasons for the errors and/or instructions for troubleshooting the errors. For example, based on a sensor failing a test after being installed in the monitoring system 200, information may be presented to the installer of the sensor via the HUD device 250 that informs the installer of reasons why the sensor may have failed the test, a message indicating that reconfiguring the sensor may likely correct the sensor error, and instructions that teach the installer to reconfigure the sensor. In some implementations, instructions provided to the installer may be presented sequentially (e.g., one step at a time), such that the installer may interact with the HUD device 250 through voice, gestures, or other inputs to navigate through the necessary steps. In some instances, the instructions may be presented to the user as a combination of visual information presented in the HUD of the HUD device 250 and audible or other data presented to the user via a speaker or other component of the HUD device 250.

In some examples, a monitoring system associated with a property features one or more devices that are wirelessly connected to the monitoring system, and a user associated with a HUD device may be interested in determining the strength of a wireless network at various locations of a property. For example, an installer may desire to install one or more cameras, sensors, or other components in the monitoring system 200, where the cameras, sensors, or other components wirelessly communicate with the monitoring system 200. For example, the cameras, sensors, or other components may communicate with the monitoring control unit 210 via the module 230 over a wireless area network (WAN) or local area network (LAN), such as a Wi-Fi network, Bluetooth connection, Z-Wave network, or ZigBee network. To determine where the cameras, sensors, or other components can be placed at the property, an installer equipped with the HUD device 250 may be provided with information in the HUD that indicates the network strength at the location of the installer (e.g., when the HUD device 250 is a wearable electronic device that the installer is wearing). Based on the installer being presented with information at the HUD device 250 that indicates the network signal strength, the installer can identify preferred locations for the placement of the one or more cameras, sensors, or other components as well as locations where the cameras, sensors, or other components are unable to communicate with the monitoring system 200. In some instances, the monitoring system 200 may utilize two or more different networks (e.g., a Wi-Fi network and a Z-Wave network) to communicate with components of the monitoring system 200, and the HUD device 250 may present indications of signal strength for one or more of the different networks.

In some implementations, data related to configuring or performing testing of cameras, sensors, or other components of a monitoring system, or for determining network signal strength in a monitoring system network, can be pushed from a local source, such as a control panel of the monitoring system or other local component. For example, an installer equipped with a HUD device 250 may provide input at the HUD device 250 to initiate a test of a new sensor installed in the monitoring system 200, and the monitoring control unit 210 may transmit data to the sensor to perform the test. Based on receiving the results of the test, the monitoring control unit 210 may transmit data to the HUD device 250 that includes information indicating whether the test was successful. In some implementations, additional information can be transmitted to the HUD device 250 in addition to the results of the test, for example, instructions indicating how the installer can reconfigure the sensor to resolve errors identified by the test. Similar techniques can be utilized to provide the HUD device 250 with data feeds from various cameras, sensors, or other components associated with the monitoring system 200, for example, by first receiving video feed data at the monitoring control unit 210 and subsequently relaying the video feed data to the HUD device 250.

In other implementations, data related to configuring or performing tests of components of a monitoring system may be sourced remotely, for example, from a server or other cloud computing source. For instance, an installer equipped with a HUD device 250 may use the HUD device 250 to initiate a test of a new sensor installed in the monitoring system 200, and the monitoring application server 260 may transmit data to the monitoring control unit 210 and/or other components of the monitoring system 200 to perform the test requested by the installer. Subsequently, the monitoring control unit 210 or another component of the monitoring system 200 may transmit data relating to the test to the monitoring application server 260 (e.g., data confirming that the test request has been received by the component or data reporting the results of the test). The monitoring application server 260 can receive the information and can relay some or all of the received information to the HUD device 250. Similar techniques can be utilized to provide data feeds from various cameras, sensors, or other components associated with the monitoring system 200, for example, by first transmitting video feed data to the monitoring application server 260 and then relaying the data to the HUD device 250.

In some implementations, configuring a camera, sensor, or other component of a monitoring system may require that the monitoring system be in a particular state. For example, a particular test performed on a camera, sensor, or other component of a monitoring system may require that the monitoring system be either in an armed on unarmed state prior to performing the test. To facilitate an installer in performing the test, the installer may be able to provide input at a device featuring a HUD to control the monitoring system. For example, an installer who is equipped with a HUD device 250 and installing or configuring a video camera to operate with the monitoring system 200 may require that the monitoring system 200 is in an unarmed state during a particular portion of the installation or configuration process. The installer may be able to provide input at the HUD device 250 that temporarily disarms the monitoring system 200 while the installation or configuration process is performed, and may provide additional input at the HUD device 250 to rearm the monitoring system 200 after the installation or configuration is complete.

Similarly, in instances in which an installer is installing or configuring a camera, sensor, or other component of a monitoring system, it may be necessary to trigger one or more alarms at a property associated with the monitoring system to validate that the camera, sensor, or component is functioning properly. In these situations, the installer may be able to temporarily deactivate the triggering of alarms by the monitoring system, or to deactivate the reporting of alarms to certain users or other recipients. For example, while configuring or testing a door sensor at a property, it may be necessary to simulate an event in which an intruder enters the property by opening the door associated with the sensor while the door is locked and the monitoring system 200 is armed. In order to avoid alerting other users associated with the property with a false intruder alarm generated while performing the sensor test, an installer equipped with a HUD device 250 may provide input at the HUD device 250 that temporarily deactivates the transmission of alarms to other users of the property. In some implementations, the installer may be able to deactivate alarms associated particular alarm events. For example, an installer may be able to deactivate alarms relating to intruder alerts, but may be able maintain alarm settings for notifying users of fires detected at the property. In some implementations, the installer may be able to deactivate alarms from being transmitted to certain users or certain groups of users. For instance, while the installer is testing a door sensor of a property associated with the monitoring system 200, the installer may provide input at the HUD device 250 that temporarily suspends notifications from being transmitted to emergency responders (e.g., police departments, fire departments, emergency medical services, etc.) while continuing to send notifications to other users of the property.

As described, in some implementations, a device featuring a heads-up display (HUD) may be feature a camera capable to obtain images and/or video from the environment of a user. For example, an installer or user of a property may be equipped with a wearable electronic device that features a HUD and that is associated with a monitoring system of a property, and the HUD device may capture images or video that includes the field of view the user or installer as they move about the property. In some implementations, images or video may be captured from the HUD device continuously, periodically, based on the detection of a particular event, or based on user input triggering the capture of images or video. In some implementations, the monitoring system can perform analysis of the images or video captured by the camera of the HUD device to identify actions to perform. The monitoring system may also store the images or video captured by the HUD device, or may transmit the images or video to another recipient over one or more networks.

In some implementations, images and/or video of a property can be used to generate maps of the property. For example, analyzing images or video may be used to generate maps that may include information defining the layout of the property, the location of various sensors, devices, or appliances within the property, locations where users of the property are likely to be located within the property (e.g., by identifying particular rooms as bedrooms), etc. Such maps may be two-dimensional (2D) models or maps of a property, or may be three-dimensional (3D) models or maps of a property.

In some implementations, images or videos of a property can be used to determine and track an inventory of the property. For example, the monitoring system may have access to information identifying various cameras, sensors, and other components of the monitoring system, and this information may be analyzed in the context of a property map to identify the locations of the cameras, sensors, or other components of the monitoring system within the property. The monitoring system can store an inventory of the various monitoring system components and their locations within the property. Additionally, image or video data obtained from the camera of a HUD device may enable the cataloging of other items within a property. For example, images or video of valuable items in a property may be stored for later use in the event that an insurance claim or recovery must be made with regards to the items. In some implementations, information defining maps of a property, information cataloging various items within a property, and inventories of monitoring system components and their respective locations may be collectively stored by the monitoring system. For example, the monitoring system 200 may maintain a "vault" of images, videos, maps, inventories, and other information associated with the property (e.g., logs and models of monitoring system control panel usage, performance logs and models for thermostats or other HVAC system components, etc.).

In some implementations, images or video obtained by a camera of a HUD device associated with a user may be transmitted to other recipients. In some instances, these images or videos are transmitted to the other recipients based on certain events being detected at the property. For instance, based on determining that an emergency is taking place at the property, the monitoring system associated with the property may transmit image or video data obtained by a HUD device to proper authorities. In some implementations, images or video can be obtained by the camera of the HUD device and transmitted to other recipients in near real time. As an example, if the monitoring system 200 detects a fire at a property, live video from one or more HUD devices 250 or other cameras associated with the monitoring system 200 may provide live video feeds to first responders, such as fire fighters or paramedics, to assist the first responders in locating the source of the fire, the locations of users within the property, etc.

In another example, images or video obtained by a camera of a HUD device associated with a user who is installing or configuring a component of the monitoring system may be transmitted to a recipient who is a remote installer. A local installer who is in the same physical location as the monitoring system component and who is equipped with the HUD device can utilize a camera of the HUD device to obtain video or images of the installation or configuration process that the installer is engaged in, and can send the video or images to the remote installer. In this way, the remote installer is provided with a view of the actual installation or configuration process that the local installer is engaged in. The remote installer receives the video or images, and can use the video or images in determining how to install or configure the monitoring system component. The remote installer may then provide the local installer who is in the same physical location as the monitoring system component with information that informs the local installer how to install or configure the monitoring system component. For example, the remote installer may be able to annotate images or video, provide diagrams, or provide other information or feedback that can then be presented visually to the local installer in the HUD device.

For instance, the remote installer may annotate an image of the monitoring system component that the local installer is installing or configuring to include information (e.g., arrows, words, etc.) that can be presented to the local installer in the heads-up display of the HUD device. The local installer can view this information while performing the installation or configuration to aid in performing these tasks. In some instances, the local installer may be provided with information from the remote installer and other information obtained by the monitoring system component that they are installing or configuring. For instance, an installer who is configuring a camera and is located in the same location as the camera can be presented information in the HUD device that includes both an annotated image received from a remote installer and a video feed obtained by the camera that the installer is configuring.

In some implementations, information determined based on the analysis of images or video obtained by a camera of a HUD device and stored by the monitoring system can be transmitted to other recipients, based on detecting certain events at a property. As an example, if a fire is detected by a particular smoke detector associated with the monitoring system of a property, the monitoring system can automatically notify a fire department of the emergency, and can further provide the fire department with map data detailing the location of the smoke detector that detected the fire at the property. This additional information may enable first responders to better navigate the property and to more efficiently locate the source of an alarm.

In some implementations, images captured by a HUD device or other camera of a monitoring system can be used to provide additional capabilities to a monitoring system. For instance, images of occupants or pets of a property may be obtained by a HUD device or other camera and used to perform visual verification of people or animals entering or exiting a property. Such visual analysis may assist in determining whether an alarm triggered at the property is due to an intruder or due to an operator error (e.g., neglecting to disarm the property's monitoring system prior to entering the property). Similarly, images of pets may be used to tune a monitoring system's pet immunity or other sensitivity settings to avoid false alarms caused by the movements of pets at the property.

Other applications associated with the configuration and use of a property monitoring system may utilize information received from, transmitted to, or obtained by a device featuring a heads-up display. Many of such applications utilize wearable electronic devices associated with one or more users of a property, where the wearable electronic devices may feature heads-up displays.

In some implementations of the described subject matter, a camera associated with a HUD device may be used as a scanner device that is capable of identifying a component of a monitoring system by scanning a barcode associated with the component. The component can be enrolled in the monitoring system based on the information encoded in the bar code.

Enrolling devices using barcodes can enable installers or other users of a property to associate a particular component with a monitoring system even when they are not located near the monitoring system. For example, an installer may have a HUD device featuring a camera or other camera device, and the installer may be able to scan a barcode on a component or component package to register the component with the monitoring system. In some instances, the installer may be able to register the component with the monitoring by designating a name of the component in addition to providing information encoded in a barcode (e.g., in addition to the data encoded in the barcode scanned using the HUD device). In some implementations, barcodes of third-party components, such as a garage door controller, furnace, etc., may be scanned by the installer to associate the third-party component with the monitoring system. Such an implementation may enable, for example, an installer to register the third-party device with a monitoring system network, such as the network 205.

In other implementations, an installer can increase the efficiency and reliability of performing monitoring system installation by registering components of the monitoring system via barcode scanning. For example, prior to installation, an installer may scan a barcode of each component to be installed in the monitoring system, and optionally may designate a name or location associated with the component. Subsequently, when the installer is installing the one or more components, the installer may be able to scan the barcode of a particular component again to be presented with information that indicates where the component should be installed in the property, how the component should be configured to function within the monitoring system, etc. In some implementations, an installer may be able to replace an existing component of a monitoring system by scanning the barcode of the replacement component and/or the barcode of the component to be replaced, where scanning the barcodes may insert the replacement component in the monitoring system in the place of the replaced component.

In some implementations, the application operating on the HUD device may enable users of the monitoring system to initialize a network rediscovery process, or to add or delete components to the monitoring system network. For example, if the monitoring system 200 utilizes a Z-Wave network as the network 205, the native control application 252 associated with the HUD device 250 may enable a user to add or delete components from the monitoring system's network 205, or may enable the user to instruct the monitoring system 200 to perform a network rediscovery process.

In some applications, data obtained by a HUD device or other camera devices associated with a property may be useful for designating and tuning entry and exit delay times associated with a property's monitoring system. For example, an exit or entry delay time may represent the amount of buffer time that the monitoring system provides users to set their alarm system and then exit the property before detecting an alarm event, or to enter the property and disarm the alarm system before detecting an alarm event. Based on image or video data obtained by a HUD device camera or other camera, the exit and entry delay times associated with a property may be adjusted to set appropriate lengths of entry and exit buffer times, to avoid false alarms at the property while maintaining effective monitoring. In some instances, an installer of a monitoring system may use a HUD device or other device to determine entry and exit times while they are installing the monitoring system. For example, the installer may simulate users exiting or entering the property, and may record the time taken to perform these actions via the HUD device or other camera. In some instances, determining the exit and entry times associated with a property may involve other data, for example, timestamps that indicate when a user has armed or disarmed the monitoring system, or timestamps that indicate when the user has provided voice commands at a HUD device that indicate when they have arrived or exited a property. Based on the image data and/or the timestamps, entry and exit times may be configured for the monitoring system. In some instances, multiple exit and entry times can be associated with a particular property. For example, a property may be associated with different exit and entry times depending upon which monitoring system control panel a user uses to arm or disarm a monitoring system, depending upon which exit or entrance the user utilizes, etc.

The use of a HUD device or other camera device may further enable installers to tune the sensitivity of a property monitoring system by designating triggering areas that should be particularly sensitive or particularly tolerant of conditions that might trigger an alarm. For example, an installer having a HUD device may perform a walk-through of a property, and may designate certain areas, such as a foyer or other high-traffic areas of a property, to be particularly tolerant of movements or noises that might inadvertently trigger an alarm. Similarly, the installer may designate other zones of the property as sensitive zones where alarms may be triggered more easily. For example, a basement area that is used infrequently by the users of a property may be more sensitive to movements that would trigger an alarm, so as to effectively detect potential intruders in the property. In some instances, an installer of a property may verify monitoring system sensitivity settings by performing a walk-through of a property and being presented with information in HUD device that indicates whether particular sensors of the monitoring system are detecting alarm events, where the installer may then further adjust the sensitivity of particular sensors or sensors associated with particular zones of the property.

In some implementations, users of a property who are equipped with a HUD device can provide input at the HUD device to indicate whether detected events at a property are emergency or duress events. For example, a user may be able to speak a certain command, provide a particular gesture, perform a certain eye movement, or provide other input at a HUD device to indicate that a particular alarm is associated with an emergency. For instance, if a smoke detector at a property is triggered, a user having a HUD device may be able to provide input at the HUD device to indicate that the triggering of the smoke detector is an emergency (e.g., that the smoke detector was triggered by a fire at the property and not someone cooking at the property).

In some instances, a user having a HUD device can use information captured by the HUD device to generate a sales quote for a home monitoring system, or other product or service associated with a property. For instance, an installer or sales associate equipped with a HUD device may perform a walk-through of a property, and a camera of the HUD device may capture images or video that can be analyzed to generate a quote for a particular product or service for the home. For instance, a quote sheet can be generated that indicates where monitoring system cameras, sensors, or other components should be placed in a property to achieve proper monitoring of the property, and the quote sheet can be provided to users to aid their purchasing process. In some instances, sales associates can include other information with the sales quote via the HUD device, or can make additional notes that may aid an installer via the HUD device. For example, information suggesting possible upgrades to the monitoring system, images of users or pets of the property to be used for setting a monitoring system's visual verification settings, etc., can be input using a HUD device and included in a sales quote or other document produced in conjunction with a sales process. While described herein with respect to generating sales quotes for property monitoring systems, similar techniques are applicable for generating other sales quotes or information relating to other sales, for example, carpet sales, appliance or HVAC system installation, cable routing, plumbing installation, room painting, etc.

Figure 3:
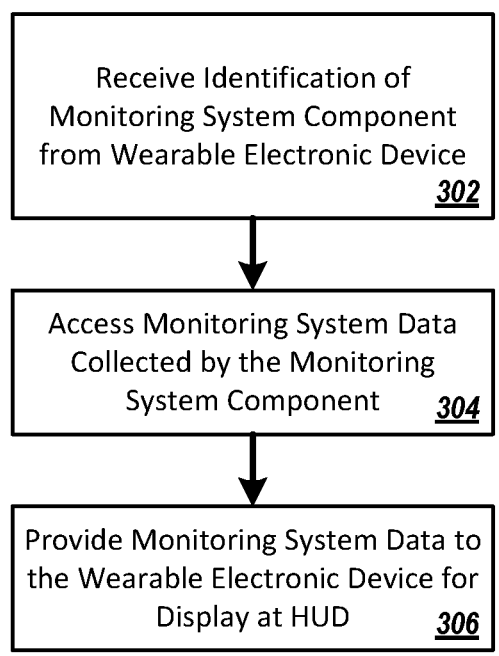
FIG. 3 depicts a flow chart of an example process.

FIG. 3 depicts a flow chart of an example process 300 that assists an installer or other user with the configuration of a monitoring system component. The process 300 assists with the configuration process by providing an installer of the monitoring system component with information from or related to the monitoring system component being installed in a heads-up display device that the installer is wearing. The installer can view this information in the heads-up display while maintaining use of both of their hands as they configure the monitoring system component. Maintaining use of both hands during the installation process also increases the safety of the installation process, especially in instances where the installer is performing the installation in a dangerous area, such as a top a ladder or on the roof of a property. In some implementations, the process 300 can be performed by the system 200 of FIG. 2. For example, the steps of the process 300 can be performed by the monitoring control unit 210 and/or the monitoring application server 260 associated with the monitoring system 200.

Data identifying a component of the monitoring system is received from a wearable electronic device that is associated with the monitoring system (302). For example, an installer wearing the HUD device 250 can provide input to the HUD device 250 that identifies a component 230 of the monitoring system that the installer is configuring. In some implementations, as described, the installer may also specify specific information that they are interested in receiving from or relating to the component 230 of the monitoring system that the installer is configuring. For example, an installer may request to receive sensor data obtained by the component 230, such as a temperature detected by a temperature sensor, or may request to receive test data for the component 230, such as data indicating whether a test of the temperature sensor was successful.

The monitoring system accesses monitoring system data collected by the component of the monitoring system that is identified by the data received from the wearable electronic device. For example, the monitoring control unit 210 can receive information identifying a camera component of the monitoring system 200, and can access video data obtained by the camera component of the monitoring system 200. In other examples, the monitoring system data collected by the component 230 of the monitoring system 200 may be sensor data collected by one or more sensors of the monitoring system 200, such as temperature data from a particular temperature sensor, audio data from a microphone or other noise sensor, humidity data from a humidity sensor, motion detection data collected by a motion or knock sensor, etc.

Additionally, in some instances the monitoring system data collected by the identified component 230 of the monitoring system 200 may be data that is not specifically related to the sensing or detection functions of the identified monitoring system component 230 but is related to the overall functionality of the identified monitoring system component 230. For example, the monitoring control unit 210 may access information collected by the identified component 230 of the monitoring system 200 that indicates the strength of a wireless network signal detected by the identified component 230, may be data that indicates the current state of a battery of the identified component 230 of the monitoring system 200, etc.

In some instances, depending upon the information received from or related to the identified component 230 of the monitoring system 200, the monitoring control unit 210, the monitoring application server 260, or another component of the monitoring system 200 may perform an analysis of the accessed monitoring system data collected by the identified component 230 of the monitoring system 200. For example, temperature sensor data obtained by a temperature sensor of the monitoring system 200 may be analyzed to determine whether the temperature data obtained by the temperature sensor is consistent with temperature data obtained by other temperature sensors associated with the monitoring system 200 or is consistent with a weather forecast for the geographical region of the property associated with the monitoring system 200. Similarly, if the monitoring system 200 is performing a test of the identified component 230, the monitoring system 200 may analyze monitoring system data obtained by the identified component 230 to determine whether the accessed data satisfies the test.

At least a portion of the monitoring system data collected by the component of the monitoring system is provided to the wearable electronic device for display at a heads-up display of the wearable electronic device. (306) For example, based on accessing the monitoring system data collected by the component 230 of the monitoring system 200, the monitoring control unit 210 of the monitoring system 200 can transmit at least a portion of the monitoring system data to the HUD device 250 for presentation at the heads-up display of the HUD device 250. The monitoring system data provided to the HUD device 250 can be output to an installer wearing the HUD device 250 such that the installer may be able to view the monitoring system data and rely on the monitoring system data in configuring the component 230 of the monitoring system 200. For example, the monitoring control unit 210 can receive a video feed from a camera component of the monitoring system and can present the video feed at the heads-up display of the HUD device 250. The installer wearing the HUD device 250 can adjust the field of view of the camera component, viewing the effects of their adjustments in the heads-up display of the HUD device 250, until the camera component is configured to have the appropriate field of view for the area of the property that the camera component is designated to monitor.

In some examples, the information provided for output at the heads-up display of the HUD device 250 can include results of an analysis of the monitoring system data obtained by the component 230 of the monitoring system 200. For example, based on the monitoring control unit 210 analyzing monitoring system data obtained by a component 230 of the monitoring system 200 to determine whether the component 230 is operating properly or passes a functionality test, the monitoring control unit 210 can provide at least a portion of the results of that analysis for presentation at the heads-up display of the HUD device 250.

Figure 4:
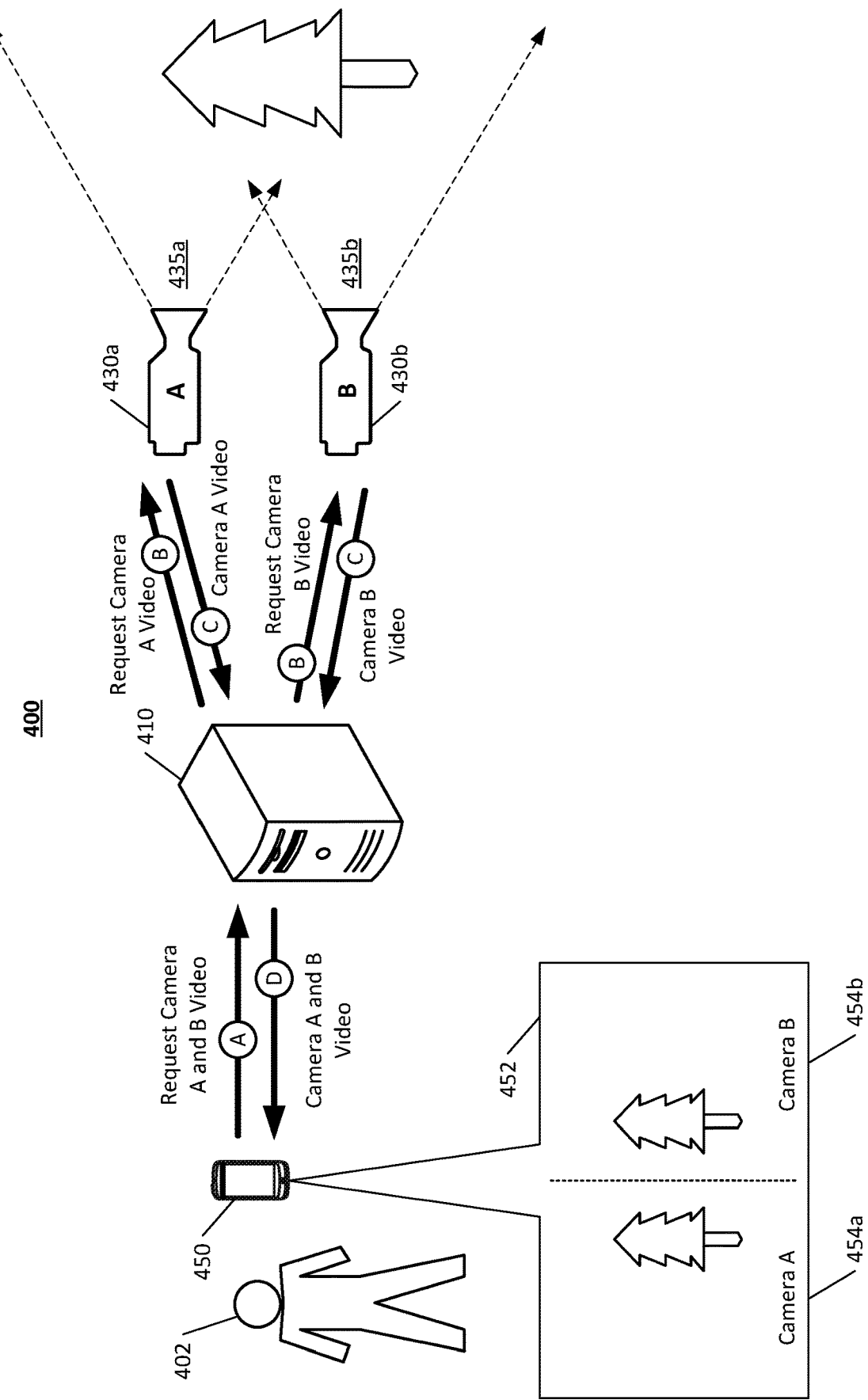
FIG. 4 illustrates an example of a system that assists with the configuring of a monitoring system using data from two or more components of a monitoring system.

FIG. 4 depicts an example system 400 that is capable of assisting with the configuration of a component of a monitoring system. In the example system 400, data obtained from multiple components of the monitoring system is presented at a heads-up display of a wearable electronic device that is being worn by an installer of the monitoring system component. For example, as shown in FIG. 4, an installer 402 may be installing one or a pair of cameras 430a, 430b and configuring the cameras 430a, 430b to monitor an area of a property. The installer may desire to view the fields of view 435a, 435b of each of the cameras 430a, 430b while configuring the cameras 430a, 430b to ensure that there is not a "blind spot" in the fields of view 435a, 435b in the area being monitored by the cameras 430a, 430b.

To allow for configuration of the cameras 430a, 430b such that the fields of view 435a, 435b will not result in a "blind spot" in the area monitored by the cameras 430a, 430b, the installer 402 can provide input to their wearable electronic device 450 that includes a heads-up display 452. The input provided by the installer 402 can identify each of the cameras 430a, 430b, and may also identify information that the installer 402 is requesting from or relating to the cameras 430a, 430b. For instance, the installer 402 can provide input to the wearable electronic device 402 that identifies the cameras 430a, 430b and further indicates that the installer 402 would like to see the fields of view 435a, 435b of each of the cameras 430a, 430b.

The request input by the installer is transmitted from the wearable electronic device 450 to a monitoring system control unit 410 (Step A). The monitoring system control unit 410, similar to the monitoring system control unit of FIG. 1, includes one or more control panels, servers, or other computing systems. The wearable electronic device 450 may transmit the request that identifies at least the cameras 430a, 430b over one or more wireless networks over which the wearable electronic device 450 and the monitoring system control unit 410 are in communication.

The monitoring system control unit 410 receives the request from the wearable electronic device that identifies the cameras 430a, 430b, and requests information from the cameras 430a, 430b in response to receiving the request (Step B). For example, based on the monitoring system control unit 410 receiving the data from the wearable electronic device 450 that identifies the cameras 430a, 430b, the monitoring system control unit 410 can request video data of the cameras' fields of view 435a, 435b by transmitting a separate request to each of the cameras 430a, 430b that requests video data from the cameras 430a, 430b. Alternatively, the monitoring system control unit 410 can transmit a single request to components of the monitoring system, including the cameras 430a, 430b that requests the video data obtained by the cameras 430a, 430b.

Each of the cameras 430a, 430b can receive the request from the monitoring system control unit 410, and can reply to the request by transmitting the requested data to the monitoring system control unit 410 (Step C). For example, each of the cameras 430a, 430b can receive a request to transmit video data to the monitoring system control unit 410, and can each reply to the request by transmitting video data or a portion of video data to the monitoring system control unit 410.

In some instances, the cameras 430a, 430b do not require a request from the monitoring system control unit 410 to transmit the video data to the monitoring system control unit 410. Rather, the cameras 430a, 430b may automatically transmit the video data to the monitoring system control unit 410, such that the monitoring system control unit 410 would not be required to request the video data from the cameras 430a, 430b, but rather would have already received or already be receiving the video data. In other instances, if the monitoring system control unit 410 requests only a portion of the video data obtained by the cameras 430a, 430b, or particular frames, such as every $10^{th}$ frame, of video obtained by the cameras 430a, 430b, the cameras 430a, 430b may respond to the request by transmitting the requested information to the monitoring system control unit 410.

The monitoring system control unit 410 receives the video data from each of the cameras 430a, 430b, and provides at least a portion of the video data obtained from each of the video cameras 430a, 430b to the wearable electronic device 450 for display at the wearable electronic device 450 (Step D). For example, based on receiving the video data from each of the cameras 430a, 430b, the monitoring system control unit 410 can combine at least a portion of the video data received from each of the cameras 430a, 430b, and can transmit the data to the wearable electronic device 450. The wearable electronic device 450 can receive the video data and can display the video data received from one of the cameras 430a in a first region 454a of the wearable electronic device's heads-up display 452, and can display video data received from the other camera 430b in a second region 454b of the wearable electronic device's heads-up display 452.

In some implementations, the monitoring system control unit 410 receives the video data from the cameras 430a, 430b and processes the video data from the cameras 430a, 430b to merge the video data received from the cameras 430a, 430b into a single segment of video data that includes the video from both cameras 430a, 430b in a single video file. For example, the monitoring system control unit 410 can process the video data received from each of the cameras 430a, 430b to generate a single video file that includes the video from the cameras 430a, 430b side-by-side as shown in the heads-up display 452 of the wearable electronic device 450.

Alternatively, the monitoring system control unit 410 may receive the video data from the cameras 430a, 430b and transmit the video data or a portion of the video data received from the cameras 430a, 430b to the wearable electronic device 450 without performing additional processing on the video data. The wearable electronic device 450 may receive the video data that was obtained from each of the cameras 430a, 430b and may present the video data obtained from each of the cameras 430a, 430b side-by-side in the heads-up display 452 of the wearable electronic device 450.

While shown in FIG. 4 as being presented in a side-by-side fashion, with the video data from one camera 430a being presented in a first region 454a of the heads-up display 452 and the video data from the other camera 430b being presented in a second region 454b of the heads-up display 452, in other implementations the data or portions of the video data obtained from the cameras 430a, 430b may be presented in other ways. For example, the video data may be presented such that the video presented in the heads-up display 452 alternates between the video data obtained from a first camera 430a and the video data obtained from a second camera 430b. The video data from one camera 430a may be presented above or below the video data from the other camera 430*b* in the heads-up display 452. Other methods of presenting the video data obtained from each of the cameras 430*a*, 430*b* may be utilized, with the result being that the installer 402 viewing the heads-up display 452 is able to comprehend each of the fields of view 435*a*, 435*b* of the cameras 430*a*, 430*b*, thereby enabling the installer 402 to configure the fields of view 435*a*, 435*b* of the cameras 430*a*, 430*b* to ensure there are no "blind spots" in the area to be monitored by the cameras 430*a*, 430*b*.

While discussed with respect to video data obtained from cameras 430*a*, 430*b*, in other implementations the process of FIG. 4 may enable an installer to view data obtained by two or more other components of a monitoring system simultaneously or to alternate between viewing data obtained by two or more other components of the monitoring system. For example, the installer 402 may request data from two different temperature sensors that are associated with the monitoring system, and may be presented with information obtained by the two temperature sensors simultaneously in the heads-up display 452 of the wearable electronic device 450.

In other examples, the installer 402 may request to view information obtained by two different types of monitoring system components simultaneously. For example, to confirm whether a door sensor is functional, the installer 402 may request to view data obtained by the door sensor and at the same time to view video data obtained by a camera that has a view of the door that the door sensor is associated with. The installer 402 may be presented, at the heads-up display 452, with information from both the door sensor and the camera, to determine, for example, whether the door sensor properly detects the door being opened when the installer 402 is able to see that the door has been opened from the video data.

Additionally, while described with respect to FIG. 4 as including data from two components of the monitoring system, in other implementations the installer 402 may request monitoring system data obtained by more than two components of the monitoring system. In such an instance, the monitoring system control unit 410 may receive the monitoring system data obtained by the components of the monitoring system and present the monitoring system data in the heads-up display 452 in a similar fashion as discussed with respect to FIG. 4.

Figure 5A:
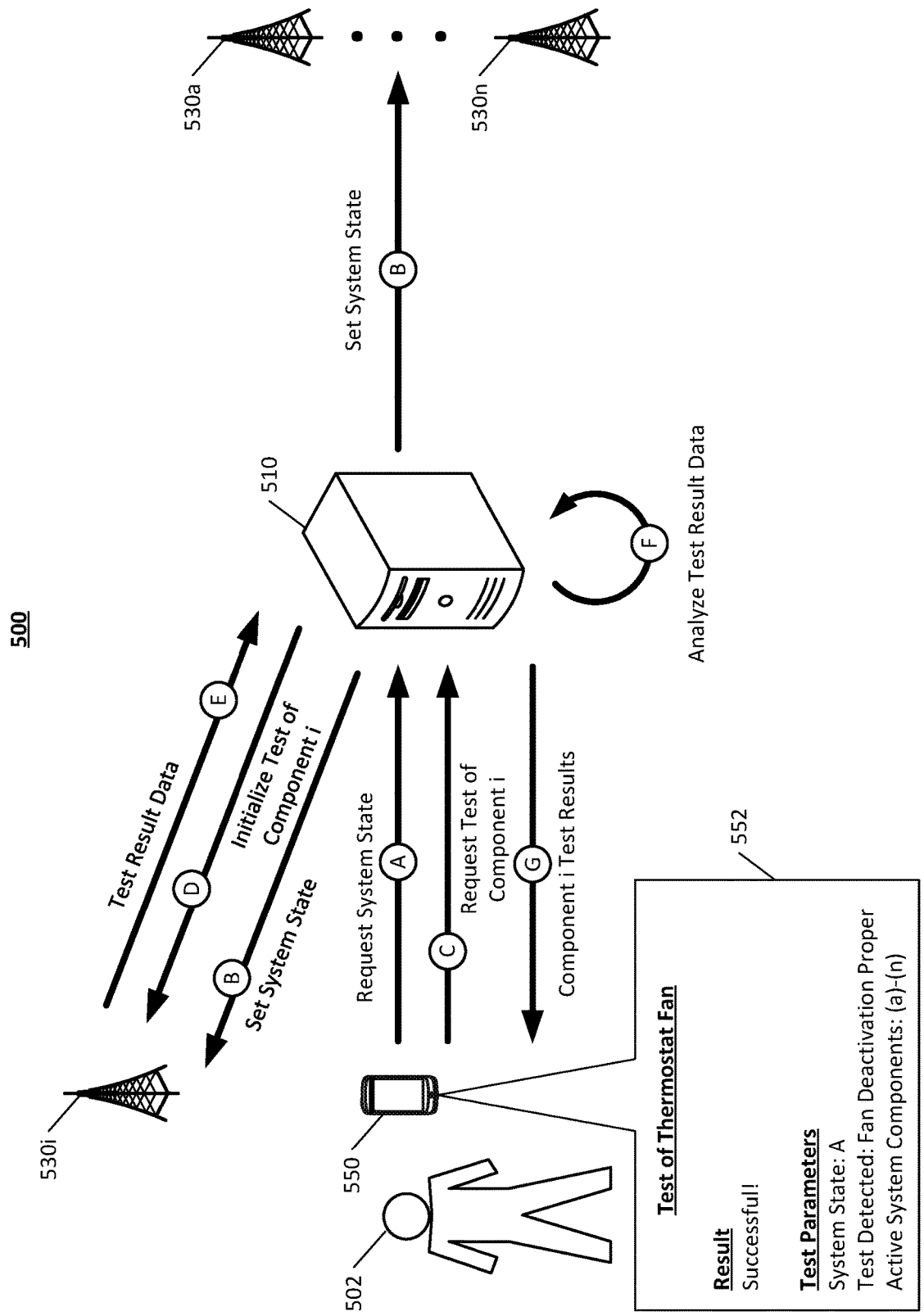
FIGS. 5A and 5B illustrate examples of a system that assists with monitoring system configuration by enabling remote testing of a component of the monitoring system.
Figure 5B:
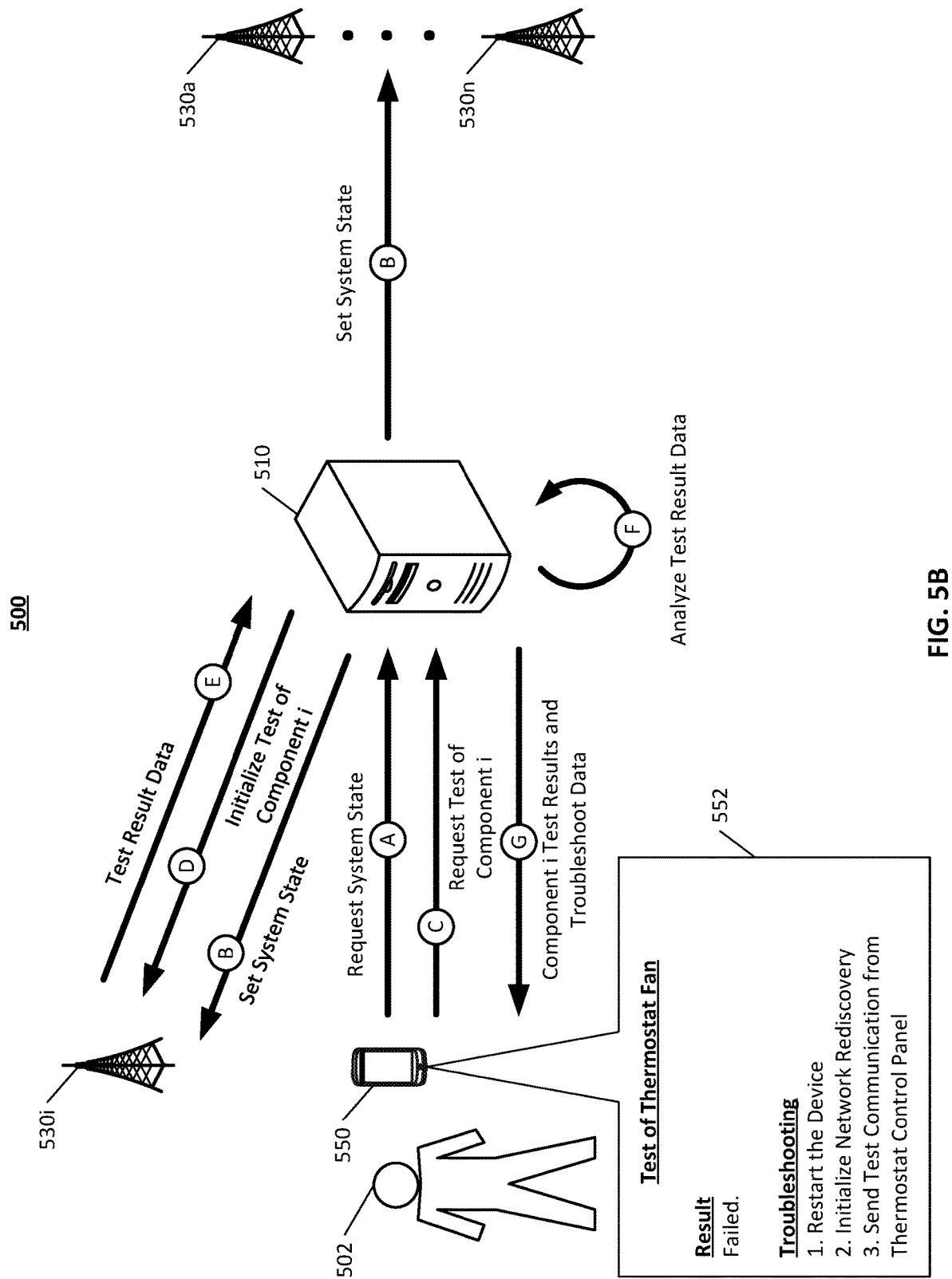

FIGS. 5A and 5B illustrate an example of a system that assists with the configuration of monitoring system components by enabling the remote testing of monitoring system components. In some examples, while configuring a component of a monitoring system, an installer of the component may need or want to test the component. If the component is located in a hard to reach area or is remote from a control panel of the monitoring system, the installer may not be able to properly test the component, or may be inconvenienced by having to move between a control panel of the monitoring system and the component while performing the test. However, when the installer can activate or control the monitoring system and testing of the component using a wearable electronic device, the installer may be able to more effectively or efficiently test the component being installed and/or configured.

For example, as shown in FIG. 5A, a system 500 includes a wearable electronic device 550 that is being worn by an installer 502, a monitoring system control unit 510, and one or more monitoring system components 530*a*-530*n*, including the component 530*i* that the installer 502 is configuring. While installing and configuring the component 530*i*, the installer 502 may desire to test the component that they are installing. In some instances, testing the component may require placing the monitoring system or one or more components of the monitoring system in a particular state. For example, the component 530*i* may be a thermostat fan that is configured to automatically turn off in response to a smoke detector detecting the presence of a possible fire. Testing of the thermostat fan may require that the monitoring system is in a particular state, such as a state that the monitoring system enters when the smoke detector detects the presence of a possible fire. Performing testing of the thermostat fan may also require the monitoring system to be in additional, or different states for additional, or different diagnostic tests.

To perform testing of the component 530*i*, the installer 502 may provide an input to their wearable electronic device 550 that specifies a particular system state that the monitoring system should be in while the test is performed. The request for the particular system state may be transmitted to the monitoring system control unit 510 by the wearable electronic device 550 (Step A). The monitoring system control unit 510 can receive the data specifying the system state, and may control the monitoring system to enter the system state (Step B). For example, the monitoring system control unit 510 may transmit data to one or more of the monitoring system components 530*a*-530*n* to place the monitoring system into the requested state. Placing the monitoring system into the requested state may involve placing one or more of the monitoring system components 530*a*-530*n* into specific states and/or may involve adjusting other parameters associated with the monitoring system, such as detection tolerances maintained by the monitoring system control unit 510 and used to determine whether specific events have occurred at the property being monitored by the monitoring system. For example, the monitoring system may enter a state associated with the monitoring system's smoke detector having detected the presence of a possible fire, or a smoke detector component of the monitoring system may be placed in a state associated with the smoke detector detecting the presence of a possible fire.

After the monitoring system has been configured to the appropriate state, the installer 502 may request a test of the particular component 530*i* of the monitoring system (State C). For example, the installer 502 may provide input at the wearable electronic device 550 that requests initialization of the testing of the particular component 530*i*, such as the thermostat fan that the installer 502 is configuring to operate with the monitoring system. The request for the testing of the monitoring system component 530*i* can be received at the monitoring system control unit 510, and the monitoring system control unit 510 can control the particular monitoring system component 530*i* to initialize the testing of the component 530*i* (Step D). For example, the monitoring system control unit 510 may transmit information to the monitoring system component 530*i* that initializes testing of the component 530*i*.

The monitoring system component 530*i* being tested can transmit test result data to the monitoring system control unit 510 as a part of its testing (Step E). For example, the monitoring system component 530*i* that is a thermostat fan can transmit data to the monitoring system control unit 510 that indicates whether the thermostat fan has automatically shut off in response to a test in which the monitoring system simulates a smoke detector detecting a possible fire. While described in the present example as data indicating whether the thermostat fan has deactivated in response to the test, other sensors, cameras, or other components of the monitoring system may gather different monitoring system data. This data is provided to the monitoring system control unit 510 for analysis by the monitoring system control unit 510, for example, to determine whether a specific event has taken place at the property or whether a specific component has passed a diagnostic test initiated by an installer 502.

The monitoring system control unit 510 analyzes the test result data obtained from the component 530i to determine whether the component 530i has passed or failed the test (Step F). For example, the monitoring system control unit 510 may analyze the monitoring system data received from the component 530i to determine whether the component 530i has responded as expected to the test. As shown in FIG. 5A, the analysis of the data received from the monitoring system component 530i indicates that the test was successful, and so the monitoring system control unit provides information for display at the heads-up display 552 of the wearable electronic device 550 that indicates that the test was successful (Step G).

For example, as shown in FIG. 5A, the heads-up display 552 of the wearable electronic device 550 may display an indication that the testing of the component 530i was successful. The heads-up display 552 may further include other information relating to the testing of the component 530i, for example, the indication that the monitoring system was in state "A" for the test of the component 530i, that the component 530i that is a thermostat fan properly deactivated during the test, and that the monitoring system at the time of the test included the active components 530a-530n.

FIG. 5B illustrates a similar example, but shows information that may be displayed to the installer 502 at the heads-up display 552 of the wearable electronic device 550 if the test of the component 530i is unsuccessful. When the monitoring system control unit 510 receives data from the component 530i in response to the monitoring system control unit 510 initializing a test of the component 530i, the monitoring system control unit 510 may perform an analysis of the data and determine that the component 530i has failed the test (Step F). For example, the monitoring system control unit 510 may analyze the data received from the thermostat fan and determine that the data received from the thermostat fan does not correspond to the anticipated response for the test. For instance, even though the monitoring system may be in a state in which a smoke detector of the monitoring system has detected a possible fire, the monitoring system control unit 510 may receive data from the thermostat fan indicating that the fan is still active, when in fact it should deactivate in response to the monitoring system receiving data from the smoke detector that indicates a possible fire. Based on an analysis of the data received from the component 530i, the monitoring system control unit 510 may determine that the component 530i has failed the test requested by the installer 502.

Additionally, based on determining that the component 530i has failed the test requested by the installer 502, monitoring system control unit 510 may determine additional information relating to the failure of the test or to configuring the component 530i to pass the test. For example, the monitoring system control unit 510 may analyze the data received from the component 530i and may determine an error that led to the component 530i failing the test. Additionally or alternatively, the monitoring system control unit 510 may determine one or more steps or potential solutions that the installer 502 may utilize in an attempt to configure the component 530i to pass the test.

The monitoring system control unit 510 can transmit data to the wearable electronic device 550 for display at the heads-up display 552 of the wearable electronic device, where the information to be displayed includes an indication that the component 530i has failed the test and includes the troubleshooting data related to configuring the component 530i to potentially pass the test. For example, as shown at FIG. 5B, the heads-up display 552 of the wearable electronic device 550 can include an indication that the test of the thermostat fan has failed and an indication of the possible troubleshooting measures that the installer 502 can take with respect to the thermostat fan to configure the thermostat fan to pass the test, namely to "restart the device," "initialize network rediscovery," or "send test communication from thermostat control panel."

The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
   a sensor that is located at the property and that is configured to generate sensor information that indicates a status of a portion of the property;
   a monitor control unit that is configured to:
     receive the sensor data; and
     generate a graphical interface that includes a representation of the sensor data; and a wearable electronic device that includes a heads-up display and that is configured to:
   receive the graphical interface that includes the representation of the sensor data;
   provide, for output on the heads-up display, the graphical interface that includes the representation of the sensor data;
   receive a request for data indicating a status of the sensor; and
   transmit, to the monitor control unit, the request for the data indicating the status of the sensor,
wherein the monitor control unit is configured to:
   receive, from the wearable electronic device, the request for the data indicating the status of the sensor; and
   transmit, to the sensor, the request for the data indicating the status of the sensor,
wherein the sensor is configured to:
   receive, from the monitor control unit, the request for the data indicating the status of the sensor;
   generate the data indicating the status of the sensor; and
   transmit, to the monitor control unit, the data indicating the status of the sensor,
wherein the monitor control unit is configured to:
   receive, from the sensor, the data indicating the status of the sensor;
   generate an updated graphical interface that includes the representation of the sensor data and a representation of the status of the sensor; and
   transmit, to the wearable electronic device, the updated graphical interface that includes the representation of the sensor data and the representation of the status of the sensor, and
wherein the wearable electronic device is configured to:
   receive, from the monitor control unit, the updated graphical interface that includes the representation of the sensor data and the representation of the status of the sensor; and
   provide, for output on the heads-up display, the updated graphical interface that includes the representation of the sensor data and the representation of the status of the sensor.

2. The monitoring system of claim 1, wherein the status of the sensor indicates a signal strength of a connection between the sensor and the monitor control unit.

3. The monitoring system of claim 1, wherein:
   the monitor control unit is configured to communicate with the sensor over a first wireless communication protocol and a second wireless communication protocol, and
   the status of the sensor indicates a first signal strength of a first connection between the sensor and the monitor control unit over the first wireless communication protocol and a second signal strength of a second connection between the sensor and the monitor control unit over the second wireless communication protocol.

4. The monitoring system of claim 3, wherein the first wireless communication protocol is Wi-Fi and a second wireless communication protocol is Z-wave.

5. The monitoring system of claim 1, wherein the status of the sensor indicates a battery level of the sensor.

6. The monitoring system of claim 1, wherein:
   the wearable electronic device is configured to receive the request for data indicating the status of the sensor by receiving a request to execute a test of the sensor,
   the sensor is configured to:
      generate the data indicating the status of the sensor by executing the test;
      based on executing the test, generate results of the test; and
      transmit, to the monitor control unit, the data indicating the status of the sensor by transmitting, to the monitor control unit, the results of the test,
   the wearable electronic device is configured to provide, for output on the heads-up display, the updated graphical interface that includes the representation of the sensor data and the representation of the results of the test.

7. The monitoring system of claim 6, wherein the monitor control unit is configured to:
   receive, from the wearable electronic device, the request for the data indicating the status of the sensor by receiving the request to execute the test of the sensor; and
   based on receiving the request to execute the test of the sensor, suppress an alarm during execution of the test of the sensor.

8. The monitoring system of claim 7, wherein the monitor control unit is configured to during execution of the test, suppress the alarm based on determining that the results of the test would cause an alarm.

9. The monitoring system of claim 7, wherein the monitor control unit is configured to:
   receive, from the wearable electronic device, the request for the data indicating the status of the sensor by receiving the request to execute the test of the sensor; and
   based on receiving the request to execute the test of the sensor, generate an alarm during execution of the test of the sensor based on receiving data from an additional sensor that is located at the property.

10. The monitoring system of claim 7, wherein the monitor control unit is configured to:
    receive, from the wearable electronic device, the request for the data indicating the status of the sensor by receiving the request to execute the test of the sensor; and
    based on receiving the request to execute the test of the sensor, suppress transmission of data indicating an alarm during execution of the test of the sensor.

11. A computer-implemented method, comprising:
    generating, by a sensor of a monitoring system that is configured to monitor a property, sensor data that indicates a status of a portion of the property;
    generating, by the monitoring system, a graphical interface that includes a representation of the sensor data;
    providing, for output on a heads-up display of a wearable electronic device, the graphical interface that includes the representation of the sensor data;
    receiving, from the wearable electronic device, a request for data indicating a status of the sensor;
    in response to receiving the request for data indicating the status of the sensor, generating, by the sensor, the data indicating the status of the sensor;
    generating, by the monitoring system, an updated graphical interface that includes the representation of the sensor data and a representation of the status of the sensor; and
    provide, for output on the heads-up display of the wearable device, the updated graphical interface that includes the representation of the sensor data and the representation of the status of the sensor.

12. The method of claim 11, wherein the status of the sensor indicates a signal strength of a connection between the sensor and the monitor control unit.

13. The method of claim 11, wherein:
the monitoring system is configured to communicate with the sensor over a first wireless communication protocol and a second wireless communication protocol, and
the status of the sensor indicates a first signal strength of a first connection between the sensor and the monitor control unit over the first wireless communication protocol and a second signal strength of a second connection between the sensor and the monitor control unit over the second wireless communication protocol.

14. The method of claim 13, wherein the first wireless communication protocol is Wi-Fi and a second wireless communication protocol is Z-wave.

15. The method of claim 11, wherein the status of the sensor indicates a battery level of the sensor.

16. The method of claim 11, comprising:
receiving the request for data indicating the status of the sensor by receiving a request to execute a test of the sensor;
generating the data indicating the status of the sensor by executing the test;
based on executing the test, generating results of the test; and
providing, for output on the heads-up display, the updated graphical interface that includes the representation of the sensor data and the representation of the results of the test.

17. The method of claim 16, comprising:
receiving, from the wearable electronic device, the request for the data indicating the status of the sensor by receiving the request to execute the test of the sensor; and
based on receiving the request to execute the test of the sensor, suppressing an alarm during execution of the test of the sensor.

18. The method of claim 17, comprising:
during execution of the test, suppressing the alarm based on determining that the results of the test would cause an alarm.

19. The method of claim 16, comprising:
receiving, from the wearable electronic device, the request for the data indicating the status of the sensor by receiving the request to execute the test of the sensor; and
based on receiving the request to execute the test of the sensor, generating an alarm during execution of the test of the sensor based on receiving data from an additional sensor that is located at the property.

20. The method of claim 16, comprising:
receiving, from the wearable electronic device, the request for the data indicating the status of the sensor by receiving the request to execute the test of the sensor; and
based on receiving the request to execute the test of the sensor, suppressing transmission of data indicating an alarm during execution of the test of the sensor.

* * * * *

UNITED STATES PATENT AND TRADEMARK OFFICE
CERTIFICATE OF CORRECTION

PATENT NO. : 10,623,622 B1  
APPLICATION NO. : 16/118808  
DATED : April 14, 2020  
INVENTOR(S) : Alison Jane Slavin, Stephen Scott Trundle and Colin Murray Page 1 of 1

It is certified that error appears in the above-identified patent and that said Letters Patent is hereby corrected as shown below:

On the Title Page

Column 1 (Assignee), Line 1, delete "Inorporated, Tyson," and insert -- Incorporated, Tysons, --, therefor.

Signed and Sealed this
Twenty-third Day of June, 2020

Andrei Iancu
*Director of the United States Patent and Trademark Office*